(12) United States Patent
VanZuilen

(10) Patent No.: US 9,768,542 B2
(45) Date of Patent: Sep. 19, 2017

(54) BLIND ELECTRICAL CONNECTOR TO PRINTED CIRCUIT BOARD IN HOUSING

(71) Applicant: BorgWarner Inc., Auburn Hills, MI (US)

(72) Inventor: David VanZuilen, Fremont, IN (US)

(73) Assignee: BorgWarner Inc., Auburn Hills, MI (US)

(*) Notice: Subject to any disclaimer, the term of this patent is extended or adjusted under 35 U.S.C. 154(b) by 352 days.

(21) Appl. No.: 14/587,656

(22) Filed: Dec. 31, 2014

(65) Prior Publication Data
US 2016/0190728 A1 Jun. 30, 2016

(51) Int. Cl.
| | | |
|---|---|---|
| *H02K 11/00* | (2016.01) | |
| *H01R 13/52* | (2006.01) | |
| *H01R 12/70* | (2011.01) | |
| *F01P 5/12* | (2006.01) | |
| *F04D 13/06* | (2006.01) | |
| *F04D 13/02* | (2006.01) | |
| *H01R 12/58* | (2011.01) | |
| *H02K 5/22* | (2006.01) | |
| *H02K 7/108* | (2006.01) | |
| *H02K 11/33* | (2016.01) | |
| *H01R 13/627* | (2006.01) | |
| *H01R 24/76* | (2011.01) | |

(52) U.S. Cl.
CPC ........... *H01R 13/5202* (2013.01); *F01P 5/12* (2013.01); *F04D 13/024* (2013.01); *F04D 13/0693* (2013.01); *H01R 12/585* (2013.01); *H01R 12/7076* (2013.01); *H02K 5/225* (2013.01); *H02K 7/1085* (2013.01); *H02K 11/33* (2016.01); *H01R 13/6273* (2013.01); *H01R 24/76* (2013.01); *H01R 2201/26* (2013.01)

(58) Field of Classification Search
CPC .. H02K 5/225; H02K 7/1085; H02K 11/0073; H02K 11/0094; H02K 11/33; H01R 12/585; H01R 12/7076; H01R 13/5202; F04D 13/0693; F04D 29/18; F04D 29/406
USPC .................................. 310/71; 439/587, 660
IPC ...................................................... H02K 11/00
See application file for complete search history.

(56) References Cited

U.S. PATENT DOCUMENTS

| | | | | |
|---|---|---|---|---|
| 4,746,306 A | * | 5/1988 | Yurtin | H01R 13/641 439/352 |
| 5,637,006 A | * | 6/1997 | Almeras | H01R 13/005 439/191 |
| 6,273,729 B1 | * | 8/2001 | Kelly | B60R 16/0207 439/148 |
| 7,059,901 B2 | * | 6/2006 | Morita | H01R 13/645 439/271 |
| 2009/0029596 A1 | * | 1/2009 | Owen, Sr. | F21S 48/212 439/638 |
| 2010/0062635 A1 | * | 3/2010 | Jones, Jr. | H01R 13/639 439/370 |
| 2012/0196465 A1 | * | 8/2012 | Stausser | H01R 13/4362 439/282 |
| 2016/0190718 A1 | * | 6/2016 | Vanzuilen | H01R 12/515 310/71 |

* cited by examiner

*Primary Examiner* — John K Kim
(74) *Attorney, Agent, or Firm* — Harness, Dickey & Pierce, P.L.C.; John A. Artz PC

(57) ABSTRACT

An electrical connector with snap-in compliant arm members, an alignment member and a plurality of pin members for mating with openings on a PCB.

20 Claims, 5 Drawing Sheets

BLIND ELECTRICAL CONNECTOR TO PRINTED CIRCUIT BOARD IN HOUSING

TECHNICAL FIELD

The present invention relates to blind electrical connectors, and more particularly, to such connectors for vehicle accessories, such as coolant pumps.

BACKGROUND

Blind connectors for electrical devices, such as vehicle engine accessories, are known today. Blind electrical connectors are utilized, for example, when it is necessary to electrically connect two parts or components and the connection step or process cannot be viewed or accomplished directly due to intervention of other parts or components. The connectors are provided in various shapes and sizes depending on the type and size of the electrical devices or accessories with which they are used.

With the emphasis today on making vehicles smaller, lighter and more efficient, but with the same reliability and durability, it is important to provide electrical connectors that are smaller and lighter and yet maintain their efficiency, durability and effectiveness for the life of the accessory or vehicle.

It is an object of the present invention to provide an improved blind electrical connector for use with electrical devices, such as vehicle engine accessories, and for coolant pumps in particular.

SUMMARY OF THE INVENTION

The electrical connector for an electrical accessory devices in accordance with a preferred embodiment of the invention includes an elongated housing with a standard multiple pin socket connector member at one end. The connector has a set of flexible arm members at the second end that snap in place inside the electrical device to hold the connector in place. A flange member on the housing is used to position the connector on electrical device and provide a seal to prohibit entry of damaging environmental factors. The sealing member also creates resistance which assists in tightly holding the connector in place.

An alignment opening and a set of electrical pin members are also positioned at the second end of the connector which is positioned in the electrical device. The electrical pins are preferably compliant pin members. One or more openings are also provided on the housing for access to the electrical leads insert molded into the housing.

The invention allows integration of the electronics into the cooling pump or other accessory, without the use of a pigtail wiring harness. This increases efficiency and reduces costs.

Further features, benefits and advantages of the invention will become apparent from the following detailed description of the invention, together with the drawings and appended claims.

DESCRIPTION OF THE PREFERRED EMBODIMENTS

For purposes of description of the inventive blind electrical connector, it will be described in use with a coolant pump, particularly a dual mode coolant pump. This is not to be taken as limiting the use of the invention, however, but only as a means for describing its features and operation. The inventive electrical connector could be used in any electrical device, such as a vehicle accessory, where a blind electrical connection is needed. The invention eliminates the need for pigtail wiring harnesses, decreases cost and improves efficiency.

The preferred coolant pump includes a friction clutch mechanism which when activated, rotates the coolant impeller at input speed. The pump also includes an electric motor, such as a brushless DC motor, which, when energized, rotates the coolant impeller at a desired speed. An electrically activated solenoid mechanism is also included and used to hold the friction clutch mechanism in an inactivated state while the electric motor is rotating the impeller.

Figure 1:
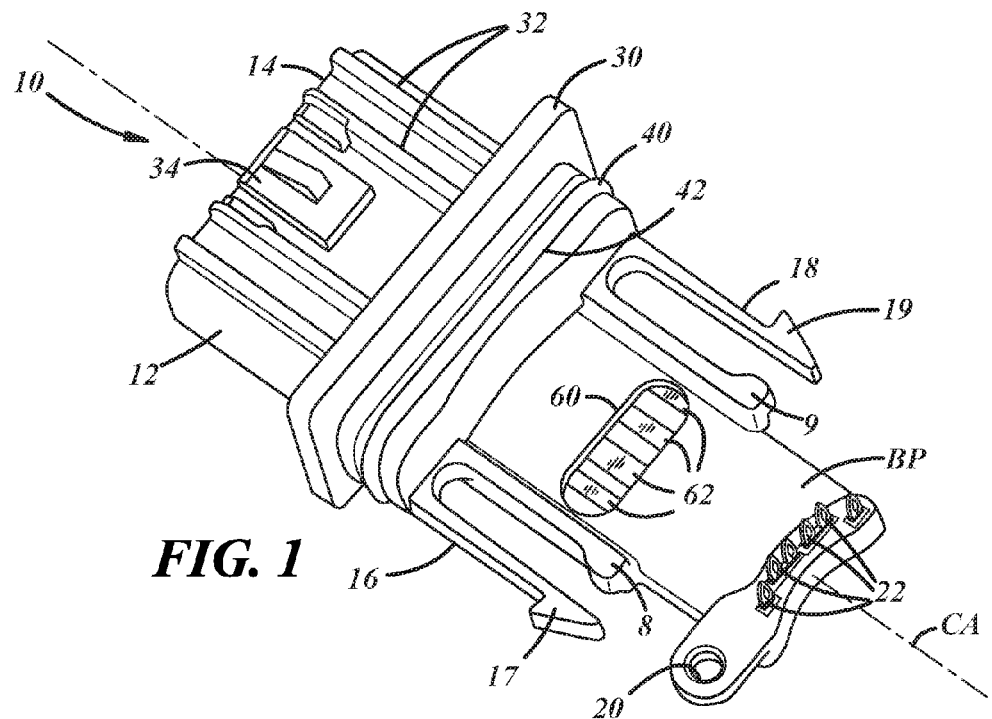
FIG. 1 is a perspective view of an embodiment of the invention.

The preferred embodiment of the blind electrical connector 10 is shown in FIGS. 1-7. FIG. 1 is a perspective view of the connector, while FIGS. 2-7 depict its use in a coolant pump 100.

The connector 10 includes a housing 12 and a plurality of electrical pin members 22. The housing 12 can include a flange member 30, a socket connector 14, a body portion BP, a pair of snap-in flexible arms 16 and 18, and an alignment member 20. The flange member 30 is positioned on the housing 12 between the two ends socket connector 14 and the body portion BP.

The socket connection 14 can be of any conventional type, such as a standard U.S. car connector 30A. This type of connector typically has four pins or leads (not shown), such as for ignition, power, ground and a local interconnect network. The external surface of the housing at the socket connector 14 has a plurality of rib members 32 and a locking member 34. These are to allow a mating and locking connection with a plug-type standard electrical connector (not shown), which is received into a connector cavity CC (FIG. 4) in the socket connection 14.

Figure 2:
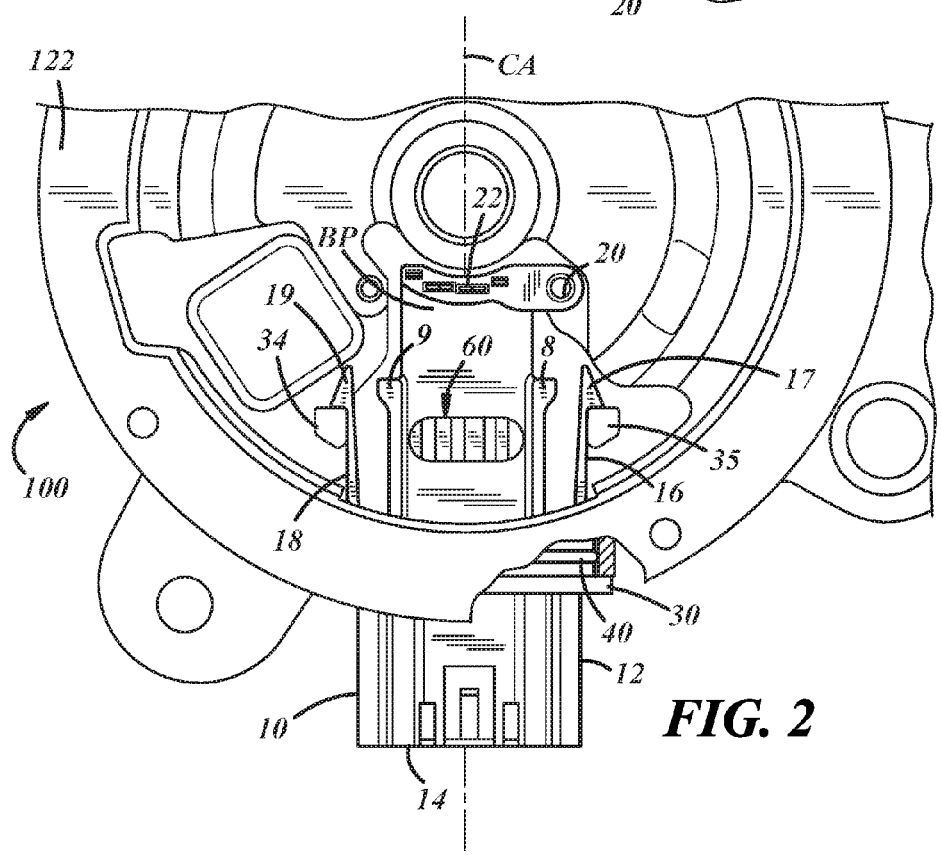
FIG. 2 depicts the positioning of an embodiment of the invention in an electrical coolant pump.
Figure 3:
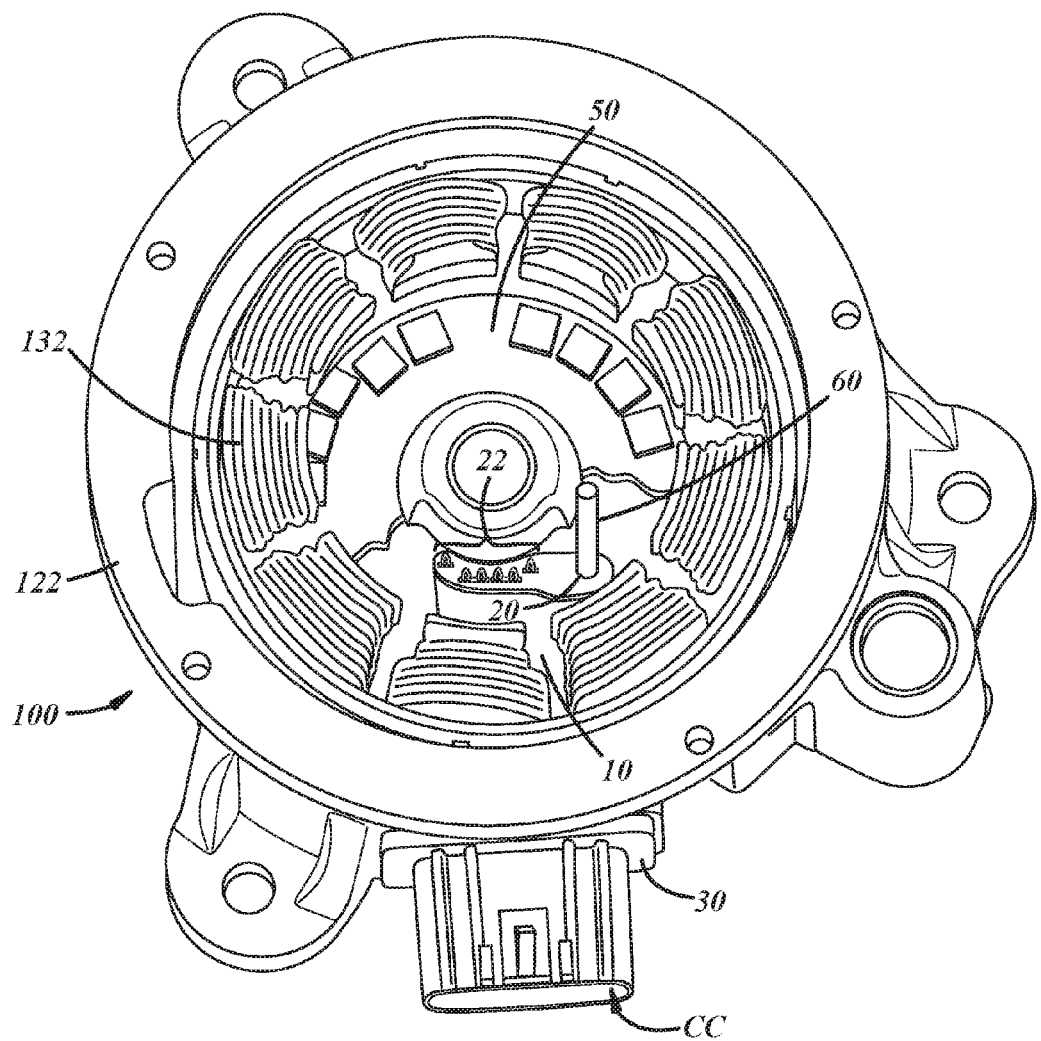
FIG. 3 depicts partial assembly of a coolant pump, including use of an alignment member.
Figure 4:
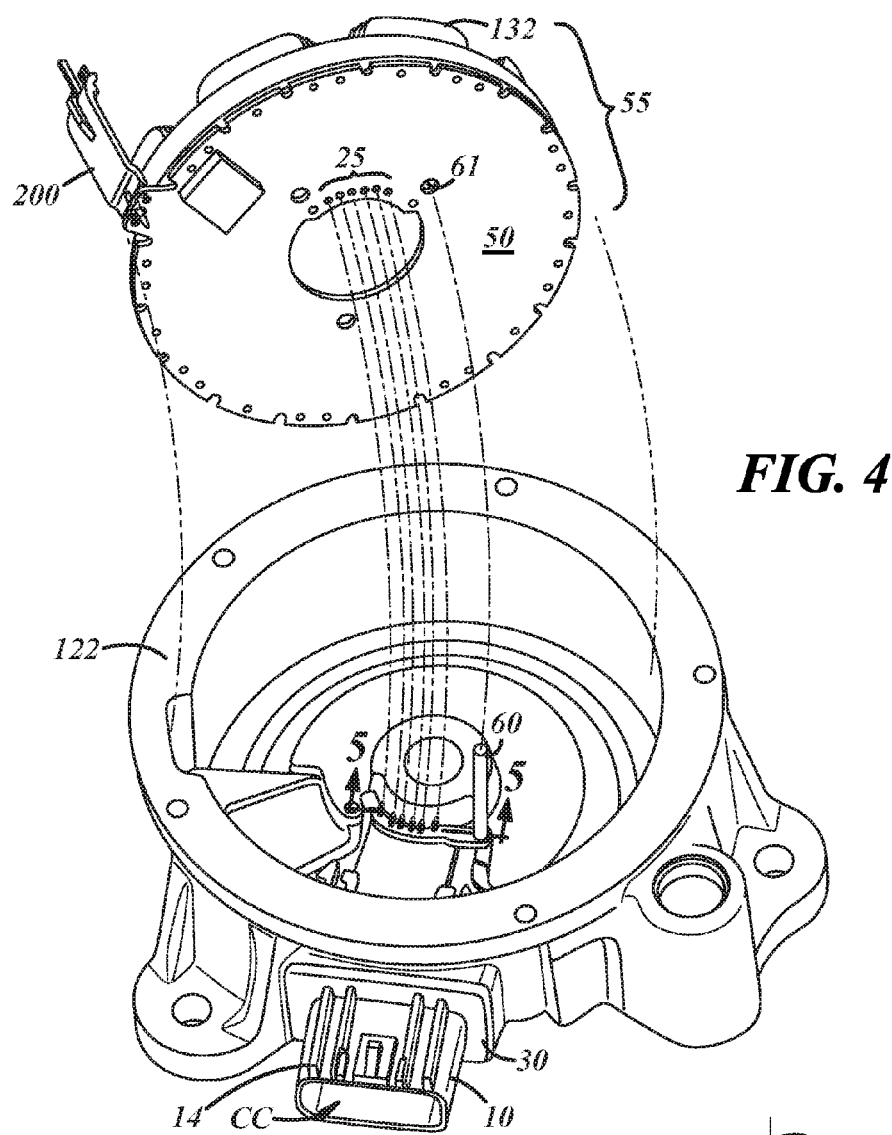
FIG. 4 depicts assembly of a printed circuit board in a coolant pump for connection to the connector.

The flange member 30 is provided to contact an outer surface of the electrical accessory or device (as shown in FIGS. 2-4) and mate and position the connector 10 with respect to the accessory or device. The flange can be flat or curved, and preferably conforms to the shape of the outer surface of the device. A sealing member 40, such as an O-ring, is positioned in a shallow groove 42 and used to seal the connection between the connector 10 and the accessory or device, such as cooling pump 100. The O-ring seal insulates the internal components from the environment and retains any potting materials inside the housing.

The arm members 16 and 18 are flexible (i.e. compliant) so they can bend inwardly as the connector 10 is inserted along an axis that is parallel to a coupling axis CA of the connector 10 into the accessory or device 100, and then returned to their normal position to hold the connector in place. The compliant arm members 16 and 18 have barbed members 17 and 19 at their ends for this purpose. Stop members 8 and 9 are provided on the connector housing 12 to prevent the arm members 17 and 19 from being overstressed and breaking during assembly. As shown in FIG. 2, when the connector 10 is positioned in a device such as cooling pump 100, the barbed end members snap-in and lock inside the device on small stop members or posts 34 and 35.

The connector housing 12 is preferably made of a durable molded plastic material, such as nylon.

The alignment member 20 is, in this embodiment, a hole or opening in which an alignment pin 60 (FIG. 5) can be positioned. The alignment member 20 can be offset from the plurality of electrical pin members 22 (i.e., as a group) in a direction that is perpendicular to the coupling axis CA (shown in FIG. 5). In this example, each of the electrical pin members 22 has a longitudinal axis that is orthogonal to the coupling axis CA and the direction relative to the coupling axis CA in which the alignment member 20 is offset from the entire group of the electrical pin members 22. Once a printed circuit board (PCB) 50 is positioned in place in the housing, it has a similar alignment hole so that the PCB can be properly positioned and oriented. This orientation is necessary so that components on the PCB can be mated and secured onto the pin members 22 in a blind assembly procedure.

For this purpose, the pin members 22 are compliant pin members and can be compressed and tightly fit into mating openings 25 in the PCB. In this instance relative to use of the connector in a coolant pump 100, the complaint pin members 22 plug into and mate with a set of electrically conductive openings 25 on the PCB. The inside surfaces of the openings 25 are coated with an electrically conductive material 26. This allows the electrical connection to run from the socket connector 12 to the complaint pin members 22 and to the PCB. The PCB in turn contains the requisite components to operate the coolant pump 100, or another accessory or device in which it is utilized.

The connector 10 also has an opening 60 used as a "knock out" opening. Preferably an aligned pair of openings are provided, one on each side of the connector for this purpose. When the connector 10 is formed, it is molded around a plurality of flat electrical lead members 62. To prevent the members 62, which are elongated thin strips of copper or another conductive metal material, from moving out of position or overlapping during the formation of the connector device 10, small connector pieces (not shown) are left between the electrical strips. The opening(s) (or "window(s)") 60 is/are utilized to allow connector pieces positioned between the strips 62 to be removed (i.e. be "knocked out").

Figure 6:
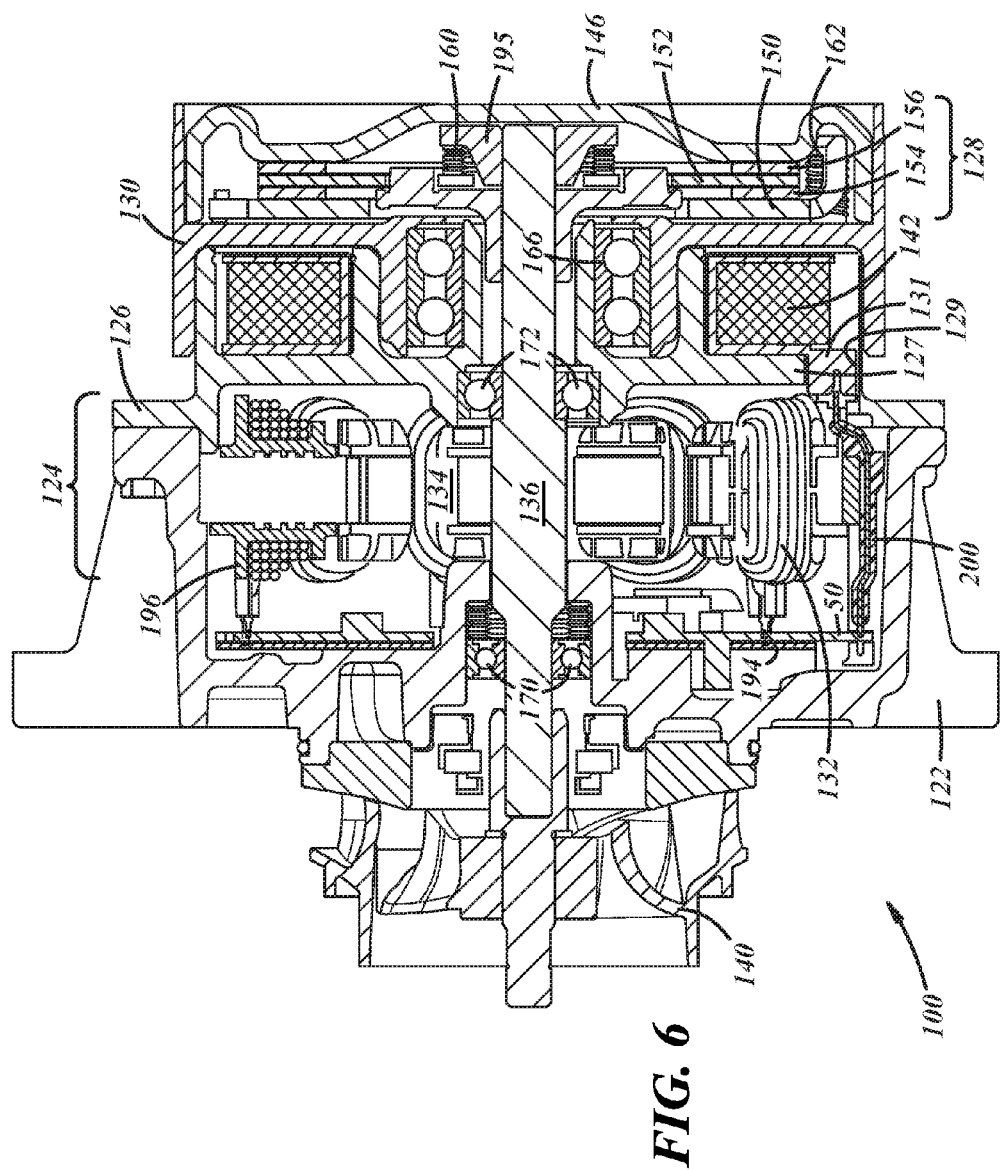
FIG. 6 is a cross-sectional view of pump 100.
Figure 7:
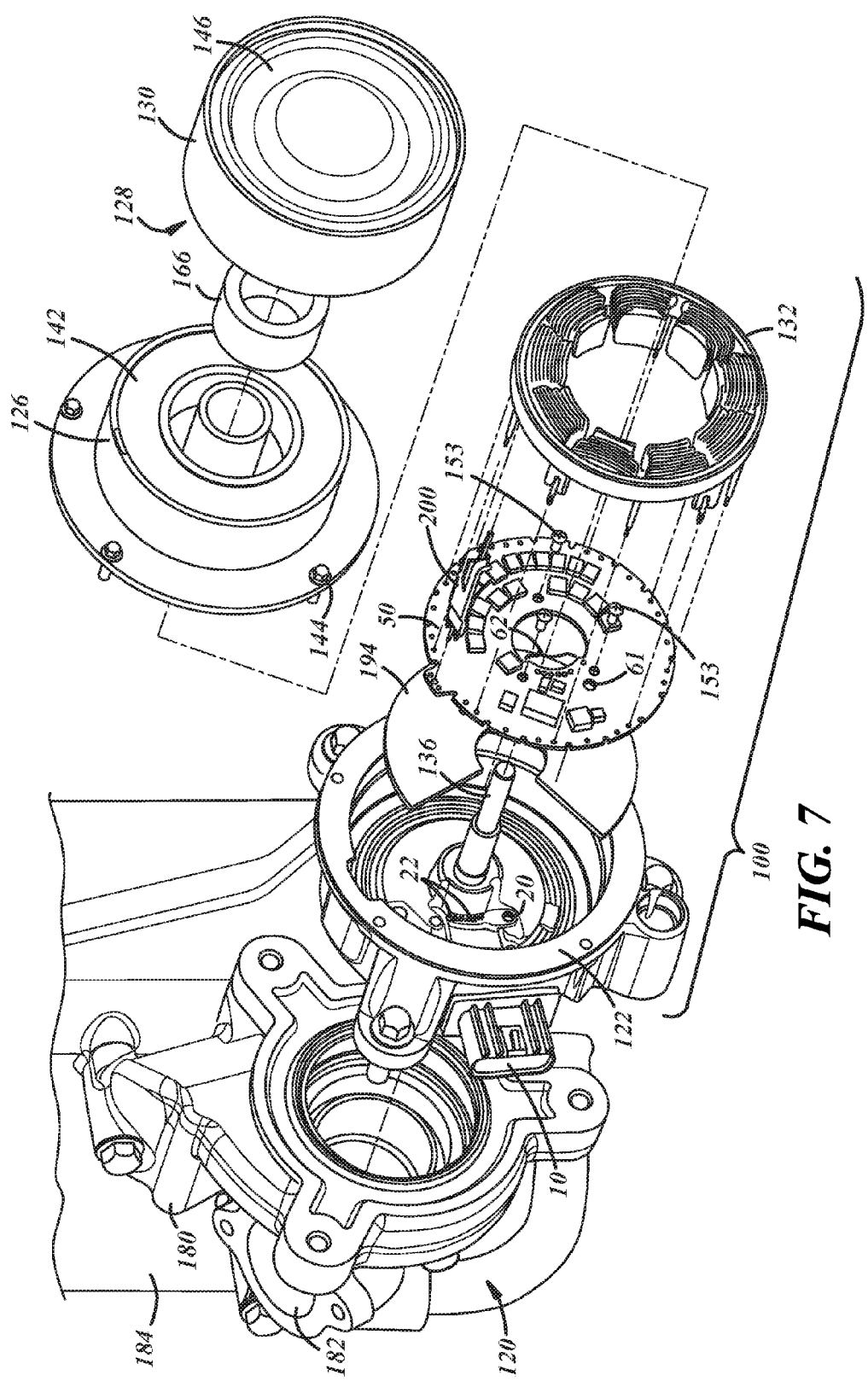
FIG. 7 is an exploded view of pump 100.

A cross-sectional view of a dual mode cooling pump 100 in which the present unique connector 10 can be utilized is shown in FIG. 6. An exploded view is shown in FIG. 7. The pump 100 includes a housing 122, an electric motor 124, a solenoid housing 126, a friction clutch mechanism 128, and a pulley member 130. The pulley member 130 is adapted to be rotated by an engine belt (not shown) in a conventional manner. The pulley member is rotated by the engine at "input speed".

A preferred dual mode coolant pump with which the inventive blind connector 10 can be utilized, is disclosed and discussed in detail in U.S. patent application Ser. No. 14/149,683, filed on Jan. 7, 2014, entitled "Accessory Drive With Friction Clutch and Electric Motor". The disclosure of that patent application is hereby incorporated herein by reference.

The electric motor 124 is preferably a brushless DC motor and includes a stator member 132 and a rotor member 134. The stator member 132 has a steel ring member 125 positioned around the circumference (perimeter). The rotor member is attached to the impeller shaft 136 which is positioned centrally in the housing 122. An impeller member 140 is attached to the impeller shaft 136 and rotates with it to circulate coolant in a vehicle engine.

The housing 122 is preferably made of a metal material with good thermal conductivity, such as aluminum. A solenoid member 142 is positioned in the solenoid housing 126 which is connected to the housing 122, preferably by fasteners, such as bolts 144. The solenoid housing is preferably made of a metal material, such a low carbon steel. A cover member 146 is positioned on the end of the solenoid housing 126 and is affixed to the pulley member 130.

When the solenoid is energized, that is, when electric current is applied to it, the solenoid deactivates the friction clutch mechanism 128. The friction clutch mechanism 128 includes an armature member 150, which is made of a magnetic material, and a friction plate member 152. Abrasive friction members 154 and 156 are fixedly attached on opposite sides of the friction plate member. The friction members can be of any conventional type and of any size and shape, such as annular rings or a plurality of separate pieces of conventional friction material. Spring member 160, such as a wave spring, biases the friction plate member away from contact with the cover member 146. Spring members 162, such as a plurality of coil spring members, bias the armature member from contact with the pulley member 130.

When the solenoid member is energized (a/k/a "activated"), the armature member 150 is pulled axially into contact with the pulley member 130 which in turn prevents the friction members on the friction plate member from contacting the cover member 146. During this operation, the pulley member runs freely on bushing member 166.

During normal operation of the coolant pump, the impeller shaft and impeller are rotated by the electric motor 124. This supplies sufficient circulation and cooling of the coolant fluid under most driving periods of a vehicle. When additional coolant flow is needed, such as when the vehicle pulls a heavy load and more cooling is required, the shaft is rotated mechanically at input speed. For this purpose, the solenoid member is deenergized (a/k/a deactivated) which allows the armature member 150 to shift axially toward the cover member 146. This allows the friction lining 156 on the friction plate member 150 to contact the cover member. Since the cover member 46 is attached to the pulley member and rotates with it, this provides rotation of the coolant shaft at input speed.

The components, including the solenoid member, armature member, friction plate member, friction linings, and biasing spring members, are all collectively part of the friction clutch mechanism 128.

The impeller shaft 136 is mounted in and rotatably supported in the coolant pump 100 by bearing members 170 and 172. The electric motor 124 is positioned on the shaft between the bearing members 170 and 172.

Additional description and details of the preferred dual mode coolant pump and its operation are contained in U.S. patent application Ser. No. 14/149,683.

The operation of the coolant pump 100 is controlled by control logic which receives data and information from an engine electronic control unit ("ECU"). The ECU receives data and information from a plurality of sensors, such as temperature sensors, and other ECUs within the vehicle. The coolant pump is thus operated to maintain the temperature of the coolant fluid within acceptable limits.

As shown in FIG. 7, the coolant pump 100 is attached to a housing 180 which has an inlet port 182 for coolant fluid and an outlet port (not shown) for passage of the coolant fluid into the engine block 184. When the impeller 140 is rotated by the dual mode coolant pump 100, the coolant liquid is pumped through the outlet port into and through the engine and the rest of the engine cooling system, and then returned to the coolant pump inlet port 182.

The electronics for the electric motor 124 and the solenoid member 142 are contained on PCB 50. The PCB contains the electronic components which electrically control the operation of the electric motor 124 and solenoid member 142, including turning them ON and OFF. Power from the PCB 50 is supplied through connector member 10. The connector member 10 has a plurality of lead wires that are connected to the PCB inside the housing 122. The lead wires include wires which provide power to the PCB and others which provide signals to operate the electric motor and solenoid member. The PCB is connected to the housing 122 by a plurality of fasteners 153.

A gap filler 194 is preferably positioned between the PCB and the inside wall of the housing 122. The gap filler conducts heat from the PCB into the aluminum housing so it can be dissipated into the coolant fluid.

Power to the electric motor is supplied from the PCB to the electric motor through lead frame member 196. Power is supplied to the solenoid member 142 through blind electrical connector member 200.

Procedures in assembly of the cooling pump 100 in which the connector member 10 is utilized are shown in FIGS. 2-7. The stator member 132 is first attached to the PCB 50 as a subassembly 55. In FIG. 4, the subassembly 55 is shown being positioned in the housing 127. The subassembly is positioned over the connector 10. An alignment pin 60 is positioned in the alignment opening 20 in the connector 10, as well as a corresponding axial aligned opening 61 in the PCB.

Figure 5:
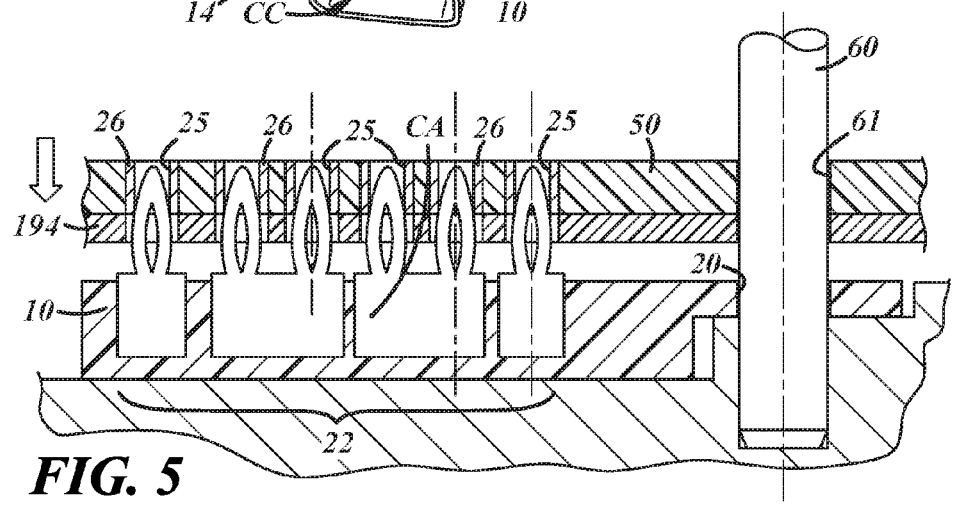
FIG. 5 is a cross-sectional view taken through the pin members in FIG. 4 is utilized.

This correctly aligns and orients the PCB in the coolant pump. This also aligns the openings 25 on the PCB with the compliant pins 22 on the connector 10, as shown in FIG. 5.

Once the opening 6 in the PCB and alignment opening 20 in the connector 10 are aligned, the PCB is pressed downwardly toward the connector, thus securely mating the two components together. The compliant pin members have a pair of arm members which are squeezed together as they are inserted in the openings 25. This provides a secure assembly and also a secure electrical connection between the PCB and the connector 10. This is a "blind" connection and completes the electrical circuit.

The electronics for the electric motor 124 and the solenoid member 142 are contained in the PCB 50. The PCB contains the electronic components which electrically control the operation of the electric motor and solenoid member, including turning them ON and OFF. Power from PCB 50 to the stator member 132 is supplied through lead wires 196. The connector member 10 has a plurality of lead wires that include wires which provide power to the PCB and others which provide signals to operate the electric motor and solenoid member.

Power is supplied to the solenoid member 142 through blind electrical connector member 200.

As shown in FIG. 4, the connector member 200 is preferably installed on the PCB before the subassembly 55 is installed in the housing. Once the subassembly 55 is installed in place, the housing is filled with a potting material. Thereafter, the solenoid and solenoid housing 126 are positioned on the housing and secured to it. The connector member 200 is secured blindly to the solenoid through an opening 129 in the wall 127 of the solenoid housing. The connector member 200 is electrically connected to the solenoid 142 through a bobbin member 131 attached to the solenoid.

Although the invention has been described with respect to preferred embodiments, it is to be also understood that it is not to be so limited since changes and modifications can be made therein which are within the full scope of this invention as detailed by the following claims.

What is claimed is:

1. A connector comprising:
a connector housing having a flange member, a socket connector, a body portion, a compliant snap-in arm member and an alignment member, the socket connector being disposed at a first end of the connector housing and extending from the flange member in a first direction, the socket connector defining a connector cavity, a rib member and a locking member, the connector cavity being adapted to receive a plurality of leads therein, the rib member being adapted to guide a mating connector into engagement with the connector along a coupling axis, the locking member being adapted to engage a mating locking member on the mating connector to fixedly but releasably couple the connector to the mating connector, the body portion extending from the flange member in a second direction opposite the first direction, the connector housing having a second end at which a distal end of the body portion terminates,
the alignment member being coupled to the body portion proximate the second end of the connector housing; and
a plurality of compliant, electrically-conductive pin members extending from the body portion proximate the second end of the connector housing;
wherein the alignment member is offset from the plurality of pin members in a direction perpendicular to the coupling axis.

2. The connector of claim 1 wherein the pin members are disposed along respective longitudinal axes that are orthogonal to the coupling axis and the direction relative to the coupling axis in which the pin members are offset.

3. The connector of claim 1 wherein the compliant snap-in arm member comprises a barbed end member.

4. The connector of claim 1 wherein the alignment member defines an alignment opening.

5. The connector of claim 4 wherein each of the pin members extends from the connector housing along a respective pin member axis, and wherein the alignment opening is disposed along an axis that is parallel to pin member axes.

6. The connector of claim 1 wherein the pin member axes are perpendicular to a longitudinal axis of the body portion.

7. The connector of claim 1, the connector housing further comprises a stop member mounted on the body portion between the flange member and the alignment member, wherein the compliant snap-in arm member comprises a beam and a barb, wherein the beam extends from the flange member parallel to the body portion, wherein the barb is disposed on an end of the beam opposite the flange member, and wherein the stop member is configured to limit pivoting of the snap-in arm member about the flange member toward the body portion.

8. The connector of claim 1 further comprising a sealing member mounted on the flange member.

9. The connector of claim 8 wherein the sealing member is an O-ring.

10. The connector of claim 1 further comprising at least one knock-out opening in the connector housing.

11. The connector of claim 10 wherein two knock-out openings are provided in the connector housing, the knock-out openings positioned in alignment on opposite sides of the connector housing.

12. A coolant pump comprising:
a housing that defines a housing cavity and a connector aperture, the housing cavity being formed along a first axis, the connector aperture being formed along a second axis that is transverse to the first axis, the connector aperture intersecting the housing cavity;
an electrical connector having a connector housing, an alignment member and a plurality of pin members, the connector housing having a flange member, a socket connector, a body portion, a compliant snap-in arm member and an alignment member, the socket connector being disposed at a first end of the connector housing and extending from the flange member in a first direction, the socket connector defining a connector cavity, a rib member and a locking member, the connector cavity being adapted to receive a plurality of leads therein, the rib member being adapted to guide a mating connector into engagement with the connector along a coupling axis, the locking member being adapted to engage a mating locking member on the mating connector to fixedly but releasably couple the connector to the mating connector, the body portion extending from the flange member in a second direction opposite the first direction, the connector housing having a second end at which a distal end of the body portion terminates, the alignment member being coupled to the body portion proximate the second end of the connector housing, the plurality of pin members extending from the body portion proximate the second end of the connector housing, wherein the connector is received through the connector aperture such that the flange member abuts an external surface of the housing member, wherein the compliant snap-in arm member engages an internal surface of the housing member to inhibit withdrawal of the connector from the connector aperture in a first direction along the second axis, wherein the pin members are disposed in the housing cavity and are oriented parallel to the first axis, and wherein the alignment member is coupled to the body portion proximate the second end of the connector housing;
a circuit board received into the housing cavity, the circuit board having circuit board terminals in electrical contact with the pin members; and
a threaded fastener disposed through the circuit board and the connector housing, the threaded fastener being threadably coupled to the housing member.

13. The coolant pump of claim 12 wherein the pin members are compliant pin members.

14. The coolant pump of claim 12 wherein the compliant arm member comprises a barbed end member.

15. The coolant pump of claim 12 the alignment member defines an alignment opening.

16. The coolant pump of claim 12 wherein the threaded fastener extends through the alignment opening.

17. The coolant pump of claim 15 wherein the alignment opening is disposed along an axis that is parallel to the first axis.

18. The coolant pump of claim 12 the connector housing further comprises a stop member mounted on the body portion between the flange member and the alignment member, wherein the compliant snap-in arm member comprises a beam and a barb, wherein the beam extends from the flange member parallel to the body portion, wherein the barb is disposed on an end of the beam opposite the flange member, and wherein the stop member is configured to limit pivoting of the snap-in arm member about the flange member toward the body portion.

19. The coolant pump of claim 18 further comprising a sealing member mounted on the flange member, the sealing member being sealingly engaged to the connector housing and the housing member.

20. The coolant pump of claim 19 wherein the sealing member is an O-ring.

* * * * *